US008125915B2

(12) United States Patent
Brenes et al.

(10) Patent No.: US 8,125,915 B2
(45) Date of Patent: Feb. 28, 2012

(54) REMOTE MANAGEMENT OF A BRIDGE DEVICE

(75) Inventors: Manrique Brenes, Corona Del Mar, CA (US); Matthew B. McRae, Laguna Beach, CA (US); Kendra S. Harrington, Irvine, CA (US); Allen J. Huotari, Garden Grove, CA (US)

(73) Assignee: Cisco Technology, Inc., San Jose, CA (US)

( * ) Notice: Subject to any disclaimer, the term of this patent is extended or adjusted under 35 U.S.C. 154(b) by 1087 days.

(21) Appl. No.: 11/195,261

(22) Filed: Aug. 1, 2005

(65) Prior Publication Data

US 2007/0025372 A1 Feb. 1, 2007

(51) Int. Cl.
*H04L 12/28* (2006.01)
(52) U.S. Cl. ........ 370/249; 370/241; 370/401; 709/200; 709/218
(58) Field of Classification Search .................. 370/241, 370/249, 401; 709/200, 218
See application file for complete search history.

(56) References Cited

U.S. PATENT DOCUMENTS

| 6,931,455 | B1 * | 8/2005 | Glass | 719/316 |
| 7,277,637 | B2 * | 10/2007 | Jette et al. | 398/70 |
| 2001/0049825 | A1 * | 12/2001 | Hirose et al. | 725/111 |
| 2003/0039240 | A1 * | 2/2003 | Sutanto | 370/352 |
| 2004/0022255 | A1 * | 2/2004 | Chen et al. | 370/401 |
| 2004/0044757 | A1 * | 3/2004 | Baker | 709/223 |
| 2004/0120329 | A1 * | 6/2004 | Chung et al. | 370/407 |
| 2004/0148439 | A1 * | 7/2004 | Harvey et al. | 709/249 |
| 2005/0100041 | A1 * | 5/2005 | You | 370/463 |
| 2006/0114835 | A1 * | 6/2006 | Horoschak et al. | 370/252 |
| 2006/0280189 | A1 * | 12/2006 | McRae et al. | 370/401 |

OTHER PUBLICATIONS

Strasser, Mario—DHCPv4 Configuration of IPsec Tunnel Mode HOWTO—Aug. 27, 2002.*
Black, Ben—IP aliasing on FreeBSD 2.2.x & 3.0—Jun. 6, 2001.*
Linksys—WRT54G Manual—2003.*
Cisco Systems—Internetworking Technologies Handbook (3rd Edition)—Dec. 2000—ISBN 1587050013.*
Chen-Becker, Derek—Converting a 642R or 645R to a Bridging Modem 642M, Jan. 18, 2004.*
Monowall Documentation Testbed—Accessing a DSL or Cable Modem IP from inside the firewall—Apr. 30,2005.*
Cisco Systems—Cisco Multiservice Broadband Cable Guide—Fall 2004.*
Cisco Systems—Configuring DHCP, ToD, TFTP services on Cisco's CMTS: all in one configuration—Mar. 11, 2004.*
Gai, Silvano et al, "RSVP Proxy", IETF Draft, Sep. 2002.*
Newmiller et al. "[vox-tech] Speedstream 5360 ADSL modem, SNMP?" Linux Users of Davis "vox-tech" discusson forum. Apr. 7,2003.*
LUGOD: Linux Users Group of Davis, "Mailing Lists" Internet Archive: Jun. 6, 2003.*
LUGOD: Linux Users Group of Davis, "Vox-Tech Mailing List Archives, Apr. 2003" Internet Archive: Jun. 6, 2003, p. 3.*

* cited by examiner

*Primary Examiner* — Dang Ton
*Assistant Examiner* — Robert M Morlan
(74) *Attorney, Agent, or Firm* — Haynes and Boone, LLP

(57) ABSTRACT

A method and system for remotely managing a bridge device, such as a modem, are disclosed. Management traffic from a service provider can be communicated to a bridge device which lacks a public IP address by sending the management traffic through the bridge device to a router of a LAN. The router then sends the management traffic back to the bridge device. Thus, the service provider can perform management tasks such as troubleshooting, health monitoring, accounting, provisioning, security and firmware upgrades in a manner that is transparent to the user.

11 Claims, 4 Drawing Sheets

REMOTE MANAGEMENT OF A BRIDGE DEVICE

TECHNICAL FIELD

The present invention relates generally to computer networking. The present invention relates more particularly to a method and system for managing a bridge device, such as a modem.

BACKGROUND

Modems for connecting local area networks (LANs) to wide area networks (WANs) are well known. For example, modems can be used in a home or small business to provide a broadband connection of a LAN to the Internet via either cable modem or digital subscriber line (DSL) technologies. Frequently, a router connects the modem to other devices, e.g., computers and printers, on the LAN.

A variety of management tasks, such as troubleshooting, health monitoring, accounting, provisioning, security and firmware upgrades must occasionally be performed upon a modem. It is desirable to perform these tasks remotely, such as by a service provider. When these tasks are performed remotely, their performance can be substantially transparent to the user. That is, service interruptions are minimal or non-existent.

In such home and small office networks, the modem is typically configured so as to function as a bridge since it interconnects two networks using the same protocol, i.e., TCP/IP. Such bridge modems may or may not be assigned a public IP address by the broadband service provider. Cable service providers typically provide a public IP address for their bridge modems in order to facilitate remote management thereof. However, DSL and other service providers do not provide public IP addresses so that they can conserve the available IP address pools. Further, DSL modems may not have private IP addresses. DSL modems and other bridge devices are generally viewed as being devices which are not addressed directly. Thus, DSL modems may not be addressable by the service provider. As such, the communication of management traffic from a service provider a DSL modem is not readily facilitated.

The assignment of an IP address to a bridge modem is not necessary in order to provide LAN functionality. However, the communication facilitated by the use of an IP address would allow a DSL service provider to more readily manage a DSL modem, much in the same manner that a cable modem service provider manages a cable modem.

Thus, although cable broadband service providers have been able to use the public IP addresses of cable modems to perform maintenance tasks, DSL and other service providers, e.g., fiber optic broadband service providers, have not be able to do so. DSL broadband service providers have recognized the need to remotely manage bridge modems. Indeed, they have addressed some of the management issues for bridge modems (assuming that the bridge modems somehow already have IP addresses).

Although DSL modems do not have public IP addresses, they may have private IP addresses. However, there is no specification regarding how to locally assign a private IP address to a DSL modem. Further, other technologies, such as fiber-to-the-premises (FTTP), have not yet prescribed how they intend to manage their broadband bridge devices.

In view of the foregoing, it is desirable to provide a system and method for facilitating the management of a bridge device that does not have a public IP address assigned thereto.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION OF THE INVENTION

A method and system for facilitating the management of a bridge device, e.g., a modem or an optical network terminal (ONT), that does not have a public IP address assigned thereto, are disclosed. According to one aspect of the present invention, an IP address is assigned to the bridge device to facilitate management thereof. The IP address can be either a private IP address or a public IP address. In either instance (whether the IP address is a private IP address or a public IP address), management of the bridge device can be performed either locally, e.g., via the LAN, or remotely, e.g., via a WAN such as the Internet. A bridge modem that does not have a public IP address assigned by the service provider can be configured to have a DHCP client on it's LAN, e.g., Ethernet, port. The router can assign a DHCP address to the bridge in multiple ways.

Figure 1:
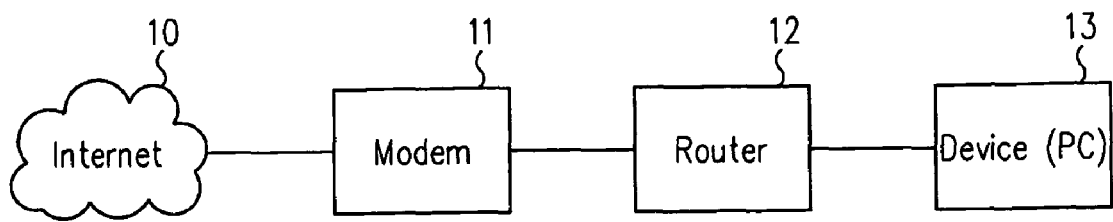
FIG. 1 is a block diagram showing the use of a modem to bridge a WAN, e.g., the Internet, and a LAN, wherein devices of the LAN are connected to one another via a router, according to an exemplary embodiment of the present invention.

Referring now to FIG. 1, communication between the Internet and a LAN is accomplished by providing a wired or optical connection between the Internet 10 and a modem 11, then providing a wired connection between modem 11 and a router 12 and also providing a wired connection between router 12 and at least one, typically a plurality, of devices such as personal computers (PCs) 13. Modem 11 can, for example, be a DSL modem.

When a shared medium is not used to facilitate communication between network devices (as is the case for the LAN of FIG. 1), then router 12 can be configured so as to facilitate response to DHCP requests on its WAN port 82 (FIG. 8) in addition to facilitating such response on its LAN ports 83. In this manner, router 12 can provide a private IP address upstream to modem 10 in response to a DHCP request therefrom. Thus, in a network without a shared medium between the bridge and router, the router's firmware can be configured to allow the router 12 to respond to DHCP requests on its WAN port 82.

Alternately, the router's firmware could be modified to implement Auto IP (link local addressing function). Multiple MAC address could be provided to facilitate the implementation of Auto IP. The bridge modem can also implement Auto IP.

Alternatively, a bridge modem that does not have a public IP assigned by the service provider can be preconfigured with a private IP address, e.g., 192.168.100.1, and can be configured as a short lease DHCP server. A router connected to the LAN port of the bridge modem will acquire a short lease private IP address, e.g., 192.168.100.2, as well as the gateway information provided by the bridge modem, i.e., it's private IP address of 192.168.100.1. The router can retain the bridge IP address information in non-volatile memory in the event of a power cycle. Thus, in the event of a reset to defaults, the process will be repeated.

In this way, the router will have knowledge of the private IP address of the bridge modem. The DHCP server can then be disabled automatically. That is, the DHCP server can be programmed so that it will self disable after a predetermined time or only after an IP address has been assigned. After the short lease DHCP address expires, the router will acquire a public IP address from the service provider. However, the router will retain the gateway information, i.e., IP address, of the bridge modem. In the case where the router is configured as a PPPoE client, it can still acquire a separate short term DHCP address on a second WAN MAC address, as defined by CableHome and DSL Forum standards.

Alternately, the router can be preconfigured with a predetermined list of known IP addresses for standardized bridge modems. Other methods for IP addressing include Link Local, and Bonjour. To enhance performance, the bridge modem's LAN IP address can be on a different subnet the router's LAN subnet.

When a service provider assigns and has knowledge of a router's public IP address, then it is not necessary for the service provider to have knowledge of the private IP address of the bridge modem.

Incoming management traffic from the WAN (which is destined for the bridge modem) can be passed through the bridge modem, to the router, and then identified by the router as management traffic and forwarded back upstream to the IP address assigned to the bridge, as discussed with reference to FIG. 5 below. Traffic can be identified by port or session type. If the bridge modem IP address is on a different subnet than the router, then the router must route. If the bridge modem IP address is on the same subnet, then the router must NAT. In either instance, it is a layer 3 forwarding decision.

Figure 2:
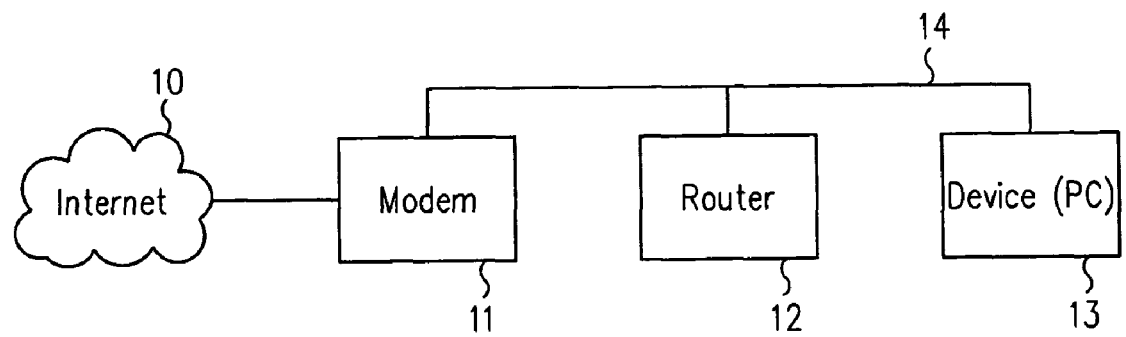
FIG. 2 is a block diagram showing the use of a modem to bridge a WAN, e.g., the Internet, and a LAN, wherein devices of the LAN are connected to one another via a wired shared medium, according to an exemplary embodiment of the present invention.

Referring now to FIG. 2, communication between the Internet and a LAN is accomplished by providing a wired or optical connection between the Internet 10 and a modem 11. However, a shared medium wired connection 14 (such as a Homeplug or MoCA wired connection) is provided between modem 11, router 12 and personal computer 13. In such shared medium LANs, a bridge (such as modem 11) or an optical network terminal (ONT) is often located outside of the home or office building. Again, modem 11 can, for example, be a DSL modem.

Figure 3:
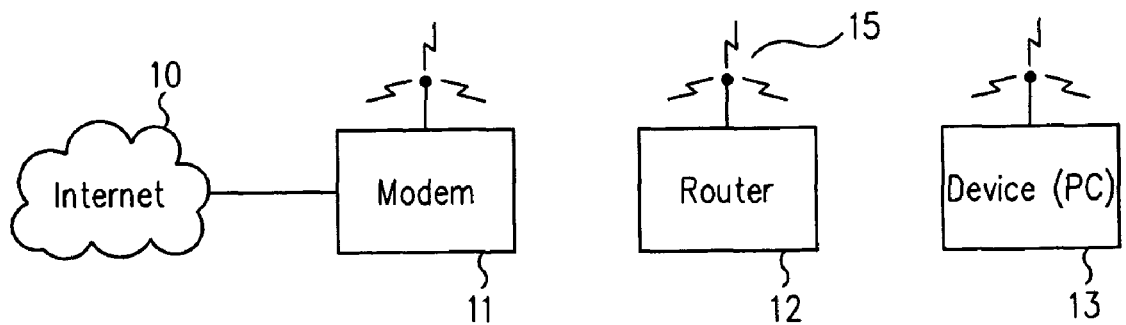
FIG. 3 is a block diagram showing the use of a modem to bridge a WAN, e.g., the Internet, and a LAN, wherein devices of the LAN are connected to one another via a wireless shared medium, according to an exemplary embodiment of the present invention.

Referring now to FIG. 3, communication between the Internet and a LAN is accomplished by providing a wired or optical connection between the Internet 10 and a modem 11. A shared medium wireless connection 15 (such as an IEEE 802.11 wireless connection) is provided between modem 11, router 12 and personal computer 13. Again, a bridge (such as modem 11) or an optical network terminal (ONT) is often located outside of the home or office building. Again, modem 11 can, for example, be a DSL modem.

In those instance where a shared connection (such as in FIGS. 2 and 3) is provided for LAN devices 13, modem 11 can send a DHCP request, such as by using a DHCP client. The DHCP request can be answered by router 12, which can thus provide a private IP address to modem 11. The shared medium facilitates communication of the private IP address from a LAN port of router 12 to modem 11.

Figure 4:
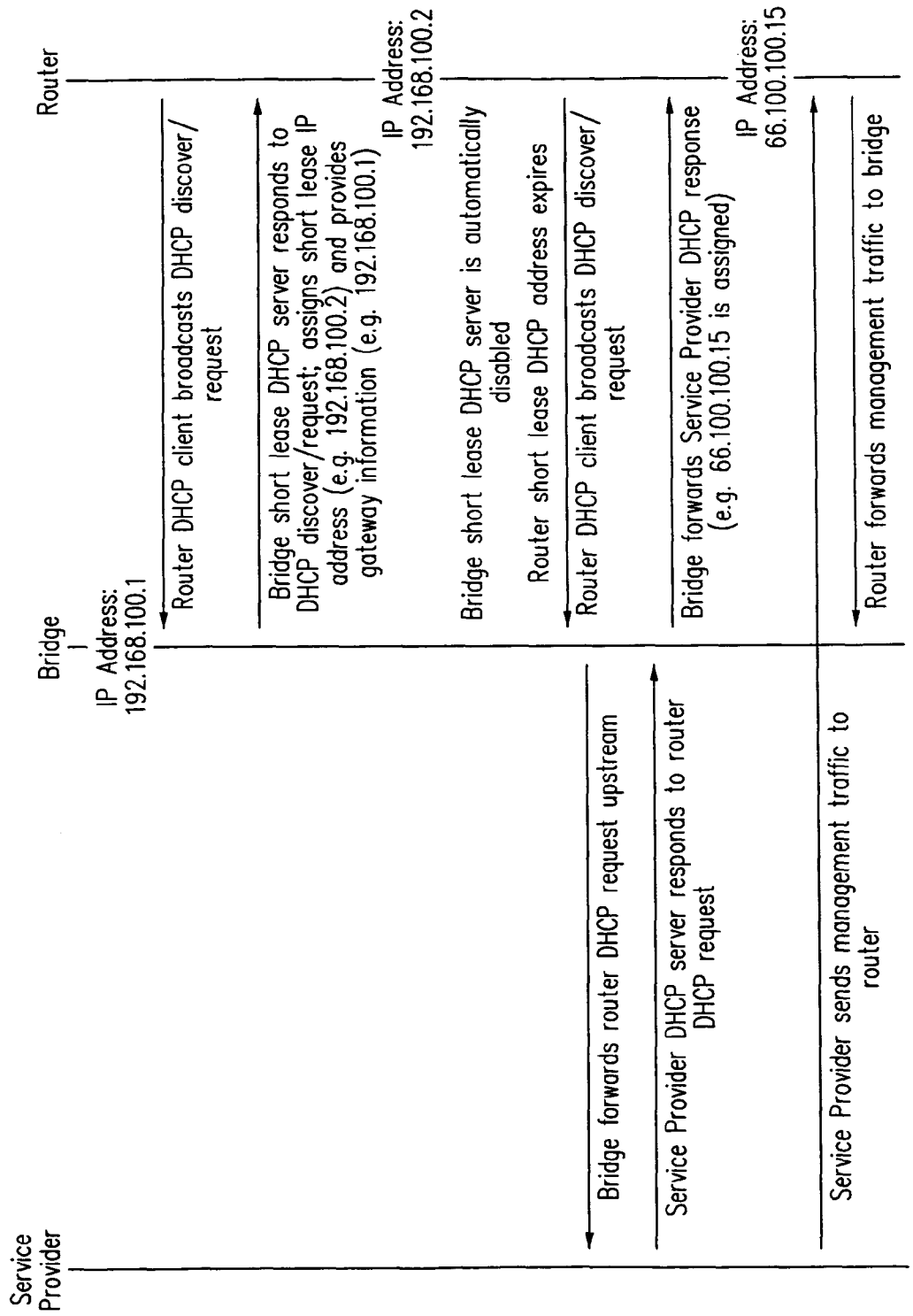
FIG. 4 is a chart showing communications between a service provider, a bridge modem, and a router, according to an exemplary embodiment of the present invention.

Referring now to FIG. 4, communications between the service provider and bridge, as well as between the bridge and router, are shown according to an exemplary embodiment of the present invention. As can be seen, after the router broadcasts a DHCP discover request, the bridge's short lease DHCP server responds to the DHCP discovery request and assigns a short lease IP address to the router. Subsequently, the router's short lease DHCP address expires. The router DHCP client then broadcasts a DHCP discovery request. The bridge forwards the router DHCP discovery request upstream.

In response to the router's DHCP discovery request, the service provider's DHCP server provides a public IP address that is forwarded by the bridge to the router. Then, when the service provider subsequently sends management traffic to the router, the management traffic is forwarded by the router to the bridge as shown in FIG. 5.

Figure 5:
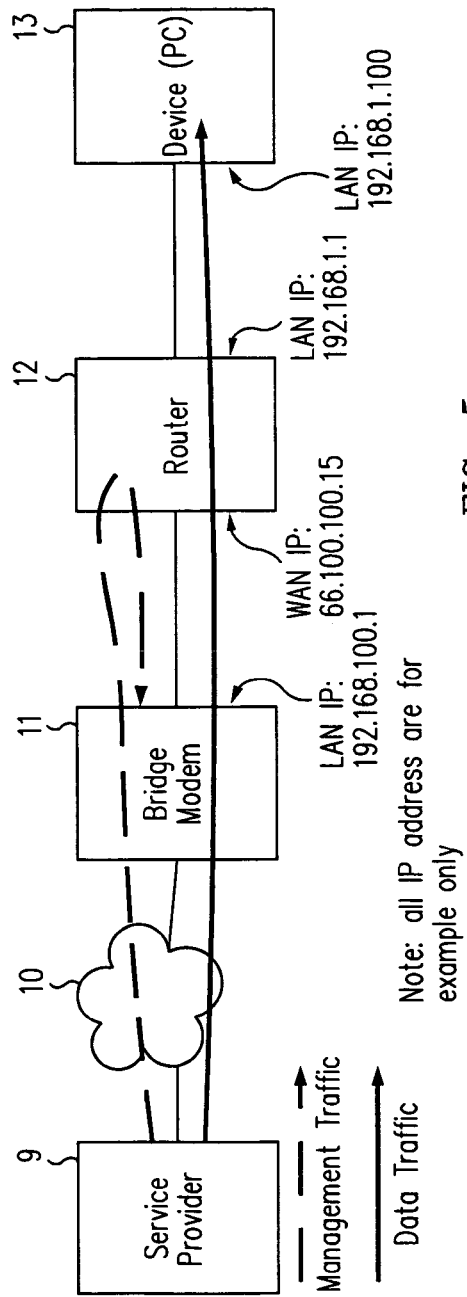
FIG. 5 is a block diagram showing communications from a service provider, through a bridge modem, to a router, and then back to the bridge modem, according to an exemplary embodiment of the present invention.

Referring now to FIG. 5, one example of routing of management traffic from a service provider 9 to modem 11 is shown. If modem 11 has a public IP address, then service provider 9 can route management traffic directly to modem 11 via the Internet 10. However, if modem 11 has a private IP address, then management traffic from service provider 9 can be routed first through modem 11 and then on to router 12. Router 12 knows the private IP address of modem 11, so router 12 can route the management traffic back to modem 11. In this manner, remote management of modem 11 is facilitated.

Figure 6:
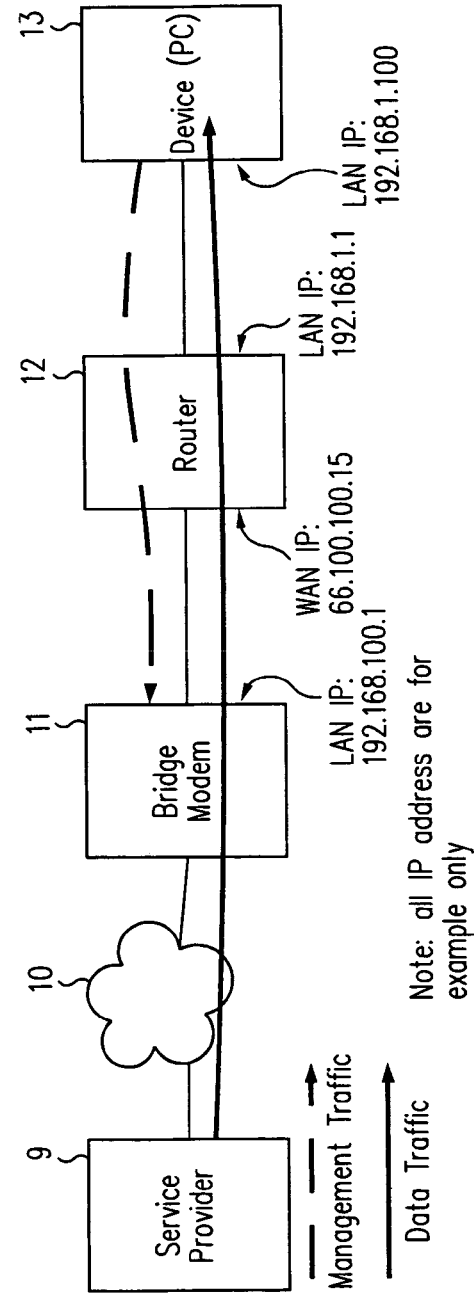
FIG. 6 is a block diagram showing communications from personal computer (PC), through a router, to a bridge modem, according to an exemplary embodiment of the present invention.

Referring now to FIG. 6, personal computer 13 can alternatively be used to manage modem 11 locally (from within the LAN). Thus, management traffic can be sent from personal computer 13, through router 12, and to modem 11. Router 12 knows the private IP address of modem 11.

Figure 7:
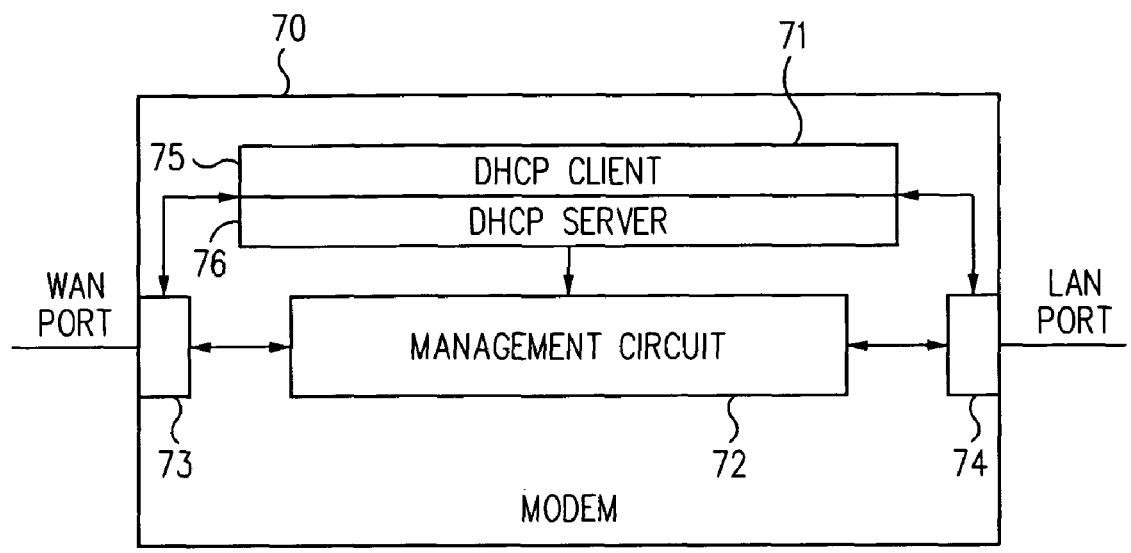
FIG. 7 is a block diagram showing a modem having an address circuit (which can comprise a DHCP server and/or a DHCP client) and a management circuit according to an embodiment of the present invention.

Referring now to FIG. 7, according to one embodiment of the present invention a modem 70 comprises an address circuit 71 that is in communication with a WAN port 73 and a LAN port 74. Address circuit 71 is configured to receive an IP address and to assign the IP address to modem 70. Thus, address circuit 71 can comprises a DHCP client 75 and a DHCP server 76. A public IP address can be received via WAN port 73. A private IP address can be received via LAN port 74. DHCP client 75 of address circuit 71 can further be configured to request an IP address from a DHCP server, either on its own or in response to a DHCP discovery request from the DHCP server. Generally, a public IP address will be administered from a DHCP server to WAN port 73 and a private IP address will be administered from a DHCP server to LAN port 74.

Modem 70 further comprises a management circuit that can be placed in communication with WAN port 73 and/or LAN port 74, when a control signal is received from address circuit 71 indicating that modem 70 had been addressed for a management task. In this event, management traffic is provided to management circuit 72 by WAN port 73 and/or LAN port 74.

Figure 8:
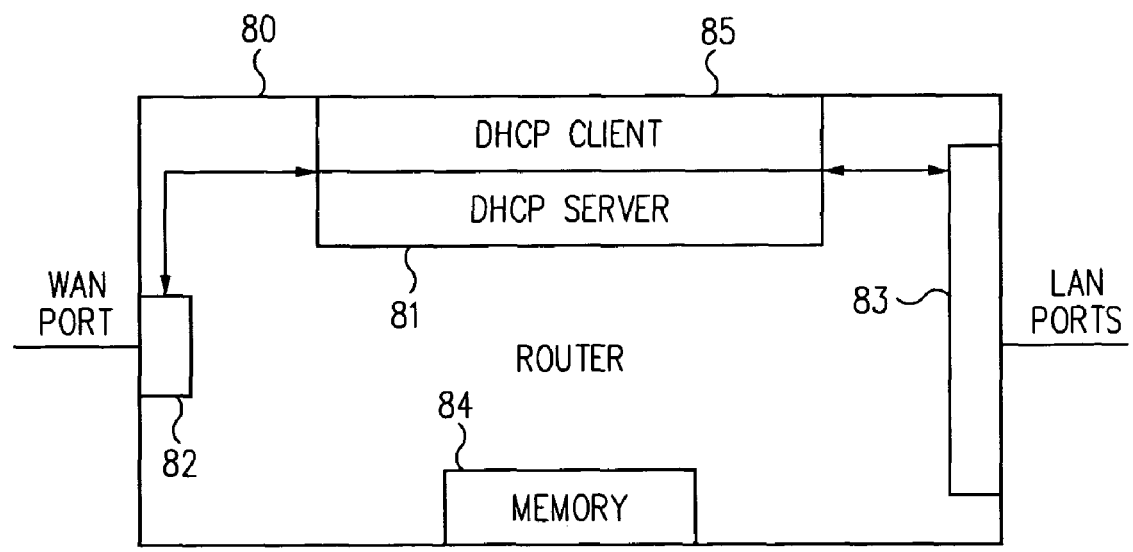
FIG. 8 is a block diagram showing a router having a DHCP server that is configured to provide IP addresses on both the LAN and WAN ports thereof and also having a memory for storing a list of predetermined potential bridge device private IP addresses, according to an exemplary embodiment of the present invention.

Referring now to FIG. 8, according to one embodiment of the present invention a router 80 comprises a DHCP server 81 that is configured to provide an IP address, typically a private IP address, in response to a DHCP request (such as from modem 70 of FIG. 7). DHCP server 81 is configured to provide an IP address on a WAN port 82 of router 80. DHCP server 81 can also be configured to provide an IP address on LAN ports 83 in the manner of a contemporary router. Router 80 can also comprise a DHCP client 85 that is configured to receive an IP address on the WAN port.

Router 80 can comprise a memory 84 that contains a list of predetermined, known IP addresses of bridge devices, as mentioned above. Thus, router 80 can try IP addresses from the list until the bridge device of the router's LAN is found. For example, router 80 can sequentially ping IP addresses from the list until a response from a bridge device is received. However, other means of determining the IP address are possible.

Although the bridge device is frequently discussed herein as being a modem (such as a DSL modem), those skilled in the art will appreciate that various other types of devices can also be bridge devices. For example, the bridge device can alternatively be an optical network terminal (ONT). Thus, discussion of the bridge device as a modem is by way of example only, and not by way of limitation.

Thus, according to one or more aspects of the present invention, a bridge device that does not have a public IP address assigned thereto can be more easily managed. Management can be done either locally (such as by a network administrator via the LAN) or remotely (such as by a broadband service provider via the Internet). A variety of management tasks, such as troubleshooting, health monitoring, accounting, provisioning, security and firmware upgrades can be performed in a manner that is substantially transparent to the user.

Embodiments described above illustrate, but do not limit, the invention. It should also be understood that numerous modifications and variations are possible in accordance with the principles of the present invention. Accordingly, the scope of the invention is defined only by the following claims.

The invention claimed is:

1. A method comprising:
   facilitating remote management of a bridge device by a servicer provider from a remote location via a wide area network (WAN) including the Internet by:
   (a) providing the bridge device that has not been assigned a public IP address by the service provider, wherein the bridge device includes a bridge device private IP address, is configured to operate as a short lease Dynamic Host Configuration Protocol (DHCP) server, and is coupled downstream from the WAN and upstream from a router through a local area network (LAN);
   (b) providing a short lease DHCP address and the bridge device private IP address by the bridge device to the router over the LAN and, in response, automatically disabling the short lease DHCP server in the bridge device;
   (c) acquiring a public IP address from the service provider by the router through the bridge device and over the WAN in response to the short lease DHCP address expiring;
   (e) forwarding management traffic received from the service provider at the remote location via the WAN through the bridge device to the router;
   (f) receiving the management traffic passed through the bridge device at the router via the public IP address;
   (g) forwarding the management traffic back to the bridge device from the router via the LAN, wherein the management traffic is forwarded from the router to the bridge device via the bridge device private IP address; and
   (h) performing at least one management task on the bridge device from the remote location with the management traffic.

2. The method as recited in claim 1, wherein the router being located downstream from the bridge device includes the router being coupled to the Internet through bridge device and the bridge device being coupled to the remote location through a connection to the Internet.

3. The method as recited in claim 1, wherein the management traffic is provided by the service provider at the remote location to facilitate remote management of the bridge device from the remote location.

4. The method as recited in claim 1, wherein the management traffic is provided by a DSL service provider at the remote location to facilitate remote management of the bridge device from the remote location.

5. The method as recited in claim 1, wherein the management traffic is provided by an optical network service provider at the remote location to facilitate remote management of the bridge device from the remote location.

6. The method as recited in claim 1, wherein the management traffic is forwarded by the service provider to the bridge device from the remote location via a wide area network to facilitate remote management of the bridge device from the remote location.

7. The method as recited in claim 1, wherein the management traffic is forwarded by the service provider to the bridge device from the remote location via the Internet to facilitate remote management of the bridge device from the remote location.

8. The method as recited in claim 1, wherein the management traffic comprises at least one type of management task selected from a group consisting of:
   troubleshooting;
   health monitoring;
   accounting;
   provisioning;
   security; and
   firmware upgrades.

9. The method as recited in claim 1, wherein the bridge device comprises a modem.

10. The method as recited in claim 1, wherein the bridge device comprises an optical network terminal.

11. A method comprising:
    providing a bridge device without a public IP address that includes a bridge device private IP address, is configured to operate as a short lease Dynamic Host Configuration Protocol (DHCP) server, and is coupled to a network and a router;
    providing a short lease DHCP address and the bridge device private IP address by the bridge device to the router and, in response, automatically disabling the short lease DHCP server in the bridge device;

acquiring a public IP address by the router through the bridge device and over the network in response to the short lease DHCP address expiring;

forwarding management traffic received over the network through the bridge device to the router;

receiving the management traffic passed through the bridge device at the router via the public IP address;

forwarding the management traffic from the router back to the bridge device using the bridge device private IP address; and performing at least one management task on the bridge device from the remote location with the management traffic.

* * * * *